United States Patent
Sakiyama et al.

[11] Patent Number: 5,822,439
[45] Date of Patent: Oct. 13, 1998

[54] NOISE CONTROL DEVICE

[75] Inventors: Kazuhiro Sakiyama, Akashi; Kazuya Sako, Kakogawa; Masaaki Nagami, Akashi; Masahiro Babasaki, Takatsuki, all of Japan

[73] Assignee: Fujitsu Ten Limited, Hyogo, Japan

[21] Appl. No.: 562,496

[22] Filed: Nov. 24, 1995

Related U.S. Application Data

[63] Continuation of Ser. No. 170,251, Dec. 22, 1993, abandoned.

[30] Foreign Application Priority Data

| May 1, 1992 | [JP] | Japan | 4-112788 |
| May 18, 1992 | [JP] | Japan | 4-124974 |
| May 19, 1992 | [JP] | Japan | 4-126294 |

[51] Int. Cl.⁶ .................................................. A61F 11/06
[52] U.S. Cl. .................. 381/71.1; 381/71.1; 381/71.5; 381/94.1
[58] Field of Search .......................... 381/71, 94, 71.1, 381/71.2, 71.3, 71.4, 71.5, 71.6, 71.7, 71.8, 71.9, 71.11, 71.12, 71.13, 71.14, 94.1, 94.2, 94.3, 94.4, 94.5, 94.6, 94.7, 94.8, 94.9, 92, 56

[56] References Cited

U.S. PATENT DOCUMENTS

| 2,810,449 | 10/1957 | Coleman . | |
| 3,688,865 | 9/1972 | Smith . | |
| 4,122,303 | 10/1978 | Chaplin et al. | 179/1 |
| 4,473,906 | 9/1984 | Warnaka et al. | 381/71 |
| 4,489,441 | 12/1984 | Chaplin | 381/71 |
| 4,527,282 | 7/1985 | Chaplin | 381/71 |
| 4,665,549 | 5/1987 | Eriksson et al. | 381/71 |
| 4,677,676 | 6/1987 | Eriksson | 381/71 |
| 4,677,677 | 6/1987 | Eriksson | 381/71 |
| 4,753,318 | 6/1988 | Mizuno et al. | 181/204 |
| 5,272,286 | 12/1993 | Cain et al. | 381/71 |
| 5,323,466 | 6/1994 | Geddes | 381/71 |

FOREIGN PATENT DOCUMENTS

| 479367 | 4/1992 | European Pat. Off. | G10R 11/16 |
| 481450 | 4/1992 | European Pat. Off. | F01N 1/06 |
| 483921A1 | 5/1992 | European Pat. Off. | G10K 11/16 |
| 2314844 | 1/1977 | France | B60R 19/02 |
| 50-31801 | 3/1975 | Japan | G10R 11/02 |
| 62-52349 | 3/1987 | Japan | G10K 11/16 |
| 62-52349A | 3/1987 | Japan | G10K 11/16 |
| 63-311396 | 12/1988 | Japan | G10R 11/16 |
| 1173406 | 12/1989 | Japan | G10K 11/16 |
| 231599 | 10/1991 | Japan | 381/71 |
| 404342813 | 11/1992 | Japan | 381/71 |
| 405046189A | 2/1993 | Japan | 381/71 |
| 8907701 | 8/1989 | WIPO | 381/71 |
| 93020551 | 10/1993 | WIPO | 381/71 |

*Primary Examiner*—Thomas D. Lee
*Assistant Examiner*—Jerome Grant, II
*Attorney, Agent, or Firm*—Oliff & Berridge, PLC

[57] ABSTRACT

A noise control device disposed at the outlet of a tail pipe which emits exhaust noise of an automobile to silence noise from the tail pipe comprises a speaker which is arranged near the tail pipe and of which the open surface has a constant angle with respect to a vertical plane, an enclosure which closes the rear portion of the speaker, and a silencing sound guide portion which guides silencing sounds emitted from the front surface of the speaker to the outlet of the tail pipe. A closed space into which a bumper for absorbing impact in case of collision is made, is used as a resonant-cavity of said speaker. Based on the amount of silencing noise which becomes greater as a plurality of microphones are arranged to be closer to the speaker, the outputs of the plurality of microphones apart a constant distance from said speaker are synthesized.

5 Claims, 18 Drawing Sheets

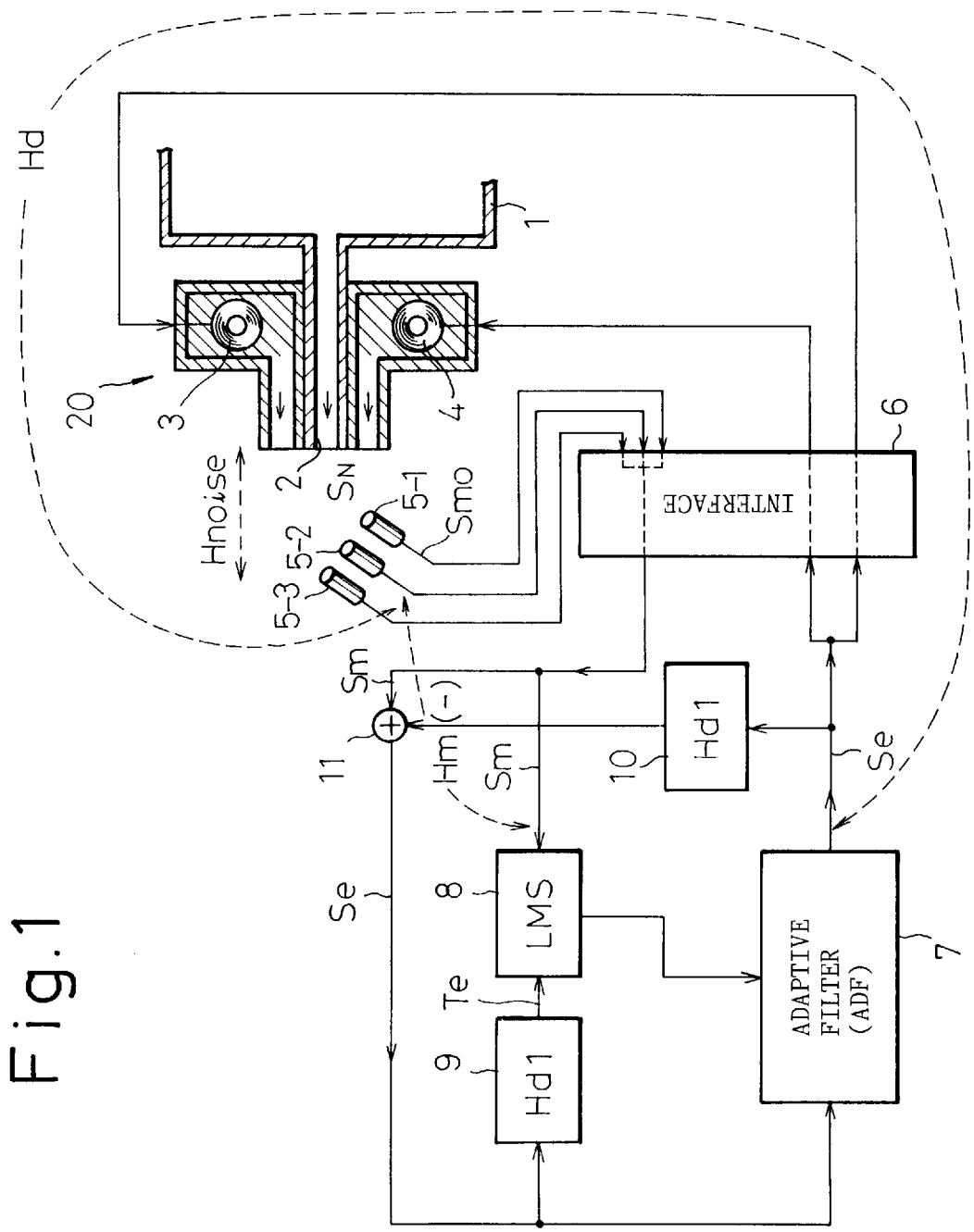

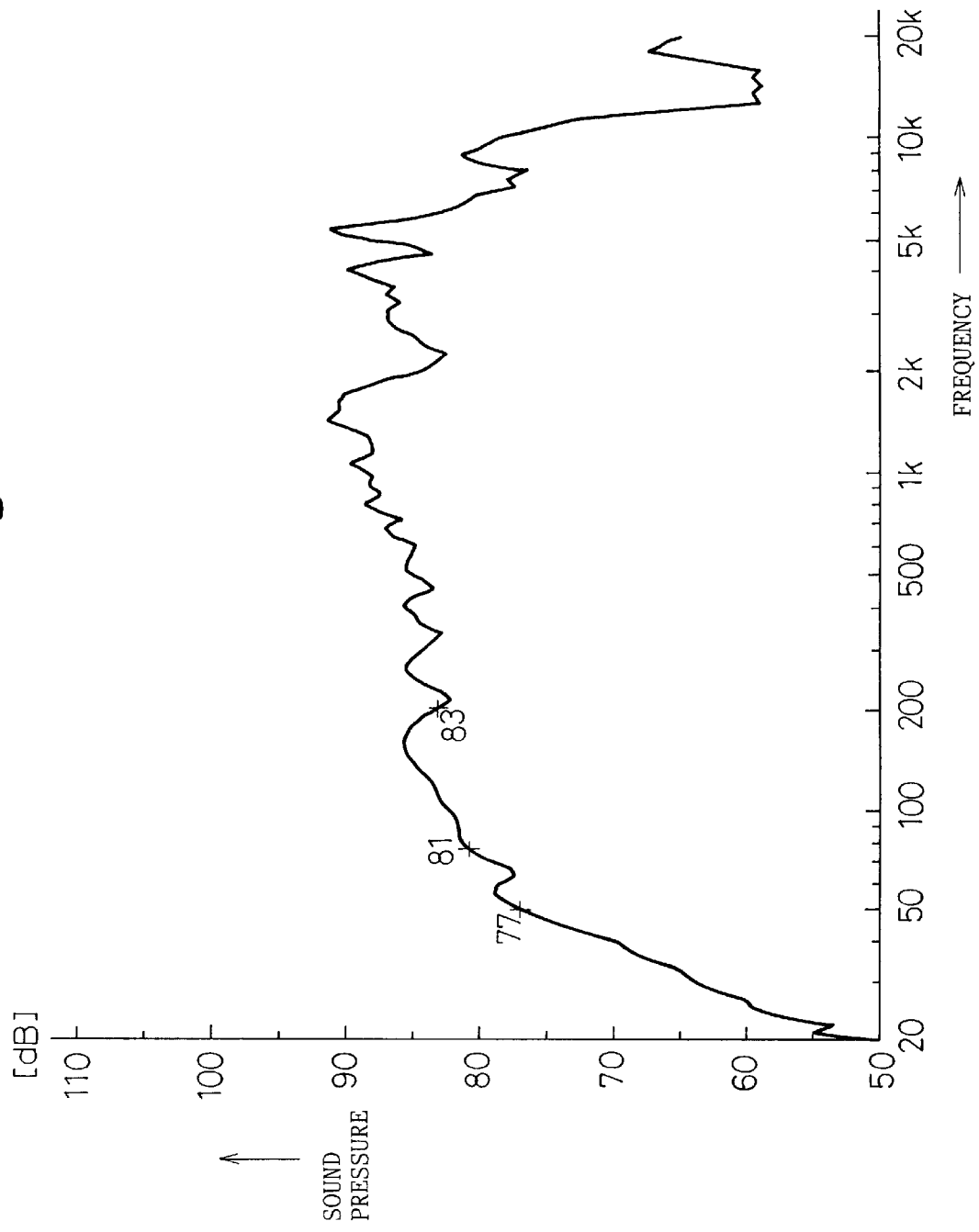

NOISE CONTROL DEVICE

This is a Continuation of application Ser. No. 08/170,251 filed Dec. 22, 1993, now abandoned.

BACKGROUND OF THE INVENTION

1. Field of the Invention

The present invention relates to a noise control device which silences noise by outputting from speakers the signals having a phase opposite to and a sound pressure equal to those of noise emitted from the muffler to an automobile, and more particularly to a device for decreasing space occupied by an actuator thereof, for increasing frequency band of the actuator, and for preventing the noise-decreasing effect from changing in space.

2. Description of the Related Art

Passive silencing devices such as mufflers or the like have heretofore been used for reducing noise produced by internal combustion engines accompanying, however, improvements from the standpoint of sizes, silencing performance, etc. There has, on the other hand, been proposed an active noise control device which cancels noise by outputting from speakers a compensation sound having a phase opposite to and a sound pressure equal to those of noise generated from the source of noise. However, putting the active noise control device into practical use has been belated due to its frequency characteristics or insufficient stability. In recent years, however, signal processing technology using digital circuits has been developed making it possible to treat frequencies over extended ranges. Therefore, many practicable noise control devices have now been proposed (for example, see Japanese Unexamined Patent Publication (Kokai) No. 63-311396).

The above publication discloses an active noise control device of the so-called two-microphone one-speaker type made up of a combination of a feedforward system and a feedback system in which noise is detected by a microphone for noise source that is installed on the upstream side of the duct, a signal having a phase opposite to and a sound pressure equal to those of the noise is formed by a signal processing circuit and is output from a speaker installed on the downstream side of the duct, and the silenced result is detected by a microphone at the silencing point and is fed back.

Next, described below is an actuator constituted by the speakers and the like.

FIGS. 17(a)–17(c) are a sectional view illustrating the constitution of an actuator 20 in a conventional noise control device. As shown in the diagram (a), a rear portion of an automobile is provided with an actuator 20 of the noise control device near a tail pipe or a terminal pipe through a muffler. The actuator 20 shown in the diagram (b) viewed from the upper direction to the ground comprises two speakers 3 and 4 symmetrically arranged with respect to a tail pipe 2 which emits noise at the terminal pipe of a muffler that silences exhaust noise of an automobile, an enclosure 21 that closes the rear portions of the speakers 3 and 4, and a silencing sound guide portion 22 that guides silencing sound from the front surfaces of the speakers 3 and 4 to the outlet of the tail pipe 2 along therewith. Space formed by the enclosure 21 at the rear portions of the speakers 3 and 4 is depicted by hatched lines. The enclosure 21 comprises a plate 21a surrounding the rear portions of the speakers 3 and 4, a front plate 21b for mounting the opening portions of the speakers 3 and 4, a plate 21c opposed to the front surfaces of the speakers 3 and 4 in order to guide the silencing sound from the front surfaces of the speakers 3 and 4 to the silencing sound guide portion 22, and a side plate 21d. The diagram (c) is a front view of when the opening of the tail pipe 2 is viewed from the direction of arrow A in the diagram (b). As shown in the diagram (c), the enclosure 21 has an oblong shape as viewed from the direction of arrow A. The front surfaces of the speakers 3 and 4 are arranged vertically in relation to the ground.

FIGS. 18(a) and 18(b) are a view illustrating the constitution of an actuator 20 in another conventional noise control device. What is different in the diagrams (a), (b) from FIG. 17 is that the front surfaces of the speakers 3 and 4 do not face each other but are directed backward toward the rear of the automobile, that is, in the same direction as the front surface of the tail pipe. What is common in FIGS. 18(a) and 18(b) are with FIGS. 17(a)–17(c) is that the front surfaces of the speakers 3 and 4 are arranged vertically in relation to the ground.

In the actuator 20 for the conventional noise control device, the diameter of the speakers 3 and 4 must be increased and the volume of space defined by the enclosure 21 must be increased in order to decrease noise of low frequencies (50 Hz to 300 Hz). That is, as shown in FIG. 17 or FIG. 18, in order to hold speakers 3 and 4 for producing bass sound, the enclosure 21 must have a width which is at least as wide as the diameter of the openings of the speakers 3 and 4. In practice, however, the actuator 20 must be installed near the outlet of the tail pipe 2 where space is narrow. If the enclosure 21 is too great in width, a fist problem arises in that the enclosure 21 is possibly in contact with the ground due to vibration when the automobile is moving.

In view of the above-mentioned problem, therefore an object of the present invention is to provide an actuator of a noise control device in which the width L of the enclosure 21 can be reduced.

Next, since the enclosure 21 does not have a great volume, a second problem arises in that the control of noise cannot be improved due to the large amount of bass vibration of the speakers, so that frequency band of the speakers becomes narrow.

In view of the above-mentioned problems, therefore another object of the present invention is to provide an actuator of a noise control device which can substantially make the volume thereof great.

Further, the silenced result as described above is detected by a microphone (sensor) to be used for feedback. In this case, the microphone should be positioned near the speaker to obtain a good effect, but since this silenced result is distributed in space, a third problem arises in that positioning a microphone only near the speaker is not sufficient to avoid disparity of the cancelled effect in space.

In view of the above-mentioned problems, therefore another object of the present invention is to provide an actuating means of a noise control device which can avoid disparity of the cancelled effect in space.

SUMMARY OF THE INVENTION

In order to solve the above-mentioned problems, the present invention provides a noise control device at the outlet of a tail pipe which emits noise at the terminal pipe of a muffler that silences exhaust noise of an automobile, in order to silence noise emitted from the tail pipe. The noise control device comprises a speaker which is arranged near the tail pipe and the open surface of which has a constant angle with respect to a vertical plane, an enclosure which encloses the rear portion of the speaker, and a silencing sound guide portion which guides silencing sound emitted from the front surface of the speaker to the outlet of the tail pipe. Further, a pair of speakers may be symmetrically arranged with respect to the tail pipe, the open surfaces of the speakers having a constant angle with respect to a vertical plane. Also, both of the open surfaces of the speakers may be directed up or down with respect to the ground. One of the open surfaces of the speakers may also be directed up with respect to the ground while the other of the open surfaces of the speakers is directed down with respect to the ground. Further, the open surfaces of the speakers may face each other to have the same angle with respect to a vertical plane. Also, the open surfaces of the speakers may be in parallel with each other and the center lines of the open surfaces may be shifted relative to each other. According to the noise control device of the present invention, the width L of the enclosure can be small, and even if the diameter of the opening portion of the speaker becomes great, a constant distance between the ground and the speaker can be maintained.

A noise control device disposed at the outlet of a tail pipe which emits noise at the terminal pipe of a muffler that silences exhaust noise of an automobile, may also comprise a plurality of speakers in a closed space formed by a bumper for absorbing impact in case of collision, and which is used as a resonant cavity for the speakers. Further, the speakers may be provided outside of the closed space and the resonant cavity of the speakers may be connected to the closed space with a duct. Also, the closed space of a trunk compartment for holding luggage may be used as resonant cavity of a plurality of speakers. Next, the muffler may be wrapped with a heat-shielding plate and removed to be installed on the back side of the bumper along the lengthwise direction of the bumper, and the speakers may be arranged in a vacant space after having removed the muffler. Also, instead of speakers, a vibration plate may be embedded in the bumper and an excitation portion may be coupled to the vibration plate to excite the plate into vibration. The tail pipe may also be divided into multiple tail pipes, and each tail pipe may be allowed to pass through the bumper, and the vibration plate and the excitation portion may be provided around each tail pipe. According to the noise control device of the present invention, the volume of the resonant cavity behind the speaker may be great so as to silence large amplitude bass noise efficiently.

Also a sound wave for silencing noise is produced by the excitation of the vibration plate embedded in the bumper, so that an actuator, such as a speaker that has little tolerance to heat and humidity is not necessary to be used. Therefore, this actuator exhibits increased resistance to heat and humidity.

Next, a noise control device disposed near the outlet of a tail pipe which emits noise at the terminal pipe of a muffler that muffles noise of an automobile is provided with a plurality of microphones that are installed at various positions separated away by a predetermined distance from a plurality of speakers and outputting silencing sound with a phase opposite to and a sound pressure equal to those of noise emitted from the tail pipe, and a synthesizing circuit that synthesizes outputs of the plurality of the microphones based upon the amount of silencing that become greater as the plurality of the microphones are arranged to be closer to a speaker. According to the noise control device of the present invention, residual sound is measured at each of the portions of the automobile by the plurality of the microphones that are installed at a position close to the actuator, at a position separated away by a predetermined distance from the actuator and at a position on the back side of the actuator where there exists leakage noise. The outputs based on the silencing contribution degrees of the plurality of the microphones are synthesized by the synthesizing circuit, and an adaptive filter forms a compensation signal based on the thus synthesized signal. That is, the sensor inputs at many silencing points are synthesized and averaged in order to obtain silencing effect not only at a place close to the tail pipe but also at places remote therefrom. Thus, deviation in the silencing effect is prevented in the automobile as a whole, and a uniform silencing effect is obtained.

BRIEF DESCRIPTION OF THE DRAWINGS

FIG. 1 is a diagram illustrating the constitution of a noise control device which is a prerequisite of an embodiment of the present invention;

FIG. 7 and FIG. 8 are graphs explaining the influence of a resonant-cavity in a speaker which extends the frequency band width thereof;

DETAILED DESCRIPTION OF THE PREFERRED EMBODIMENTS

Figure 2A:
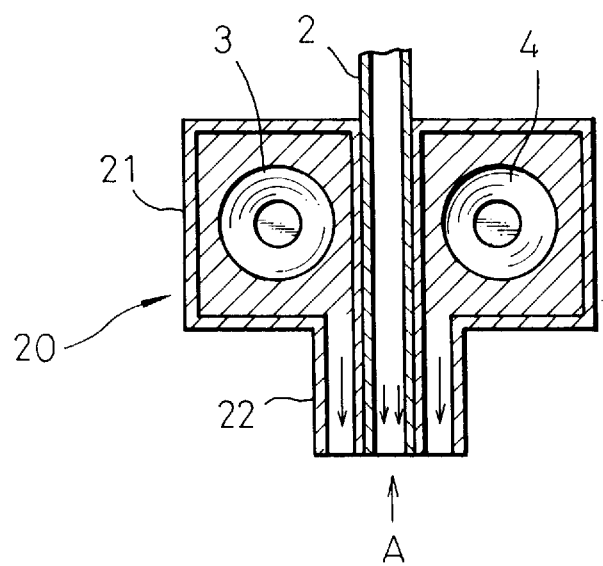
FIGS. 2(a) and 2(b) are diagrams illustrating the constitution of an actuator 20 of the noise control device according to a first embodiment of the present invention, in which front-surfaces of speakers are horizontal to the ground and are directed in an upper direction.

Embodiments of the present invention will now be described with reference to the drawings.

FIG. 1 is a diagram illustrating the constitution of a noise control device which is a prerequisite of an embodiment of the present invention. The noise control device diagramed here is constituted by two speakers 3 and 4 for silencing noise emitted from a tail pipe 2 that is the terminal pipe of a muffler 1 that silences exhaust noise of an automobile, three microphones 5-1, 5-2 and 5-3 which are arranged as will be described later to trap, as an error signal, residual noise consisting of noise from the tail pipe 2 and silencing sound which is emitted from the speakers 3 and 4 and has a phase opposite to and a sound pressure equal to those of the noise, an interface 6 which converts a signal to the speakers 3 and 4 into an analog signal from the digital form and amplifies it, converts analog signals of the microphones 5-1, 5-2 and 5-3 into digital signals and amplifies them, and adaptive filter 7 of FIR (finite impulse response) which inputs a reproduced noise signal that will be described later as to-be-controlled signal and forms a compensation sound that silences noise via the interface 6, a coefficient updating means 8 which inputs a synthesized signal of error signals from the microphones 5-1, 5-2 and 5-3 and updates the filter coefficient of FIR of the adaptive filter 7, a first transfer characteristics simulating means 9 which inputs said reproduced noise signal and simulates transfer characteristics of from the output of the adaptive filter 7 through the interface 6, speakers 3 and 4, microphones 5-1, 5-2 and 5-3 up to the coefficient updating means 8 in order to provide the filter coefficient of the coefficient updating means 8, a second transfer characteristics simulation means 10 which inputs a compensation signal from the adaptive filter 7 and has the same transfer characteristics as the above first transfer characteristics simulation means 9, and a differential signal calculation means 11 which calculates a differential signal between an output signal of the second transfer characteristics simulation means 10 and a synthesized signal of output signals of the microphones 5-1, 5-2 and 5-3, and sends the differential signal as a reproduced noise signal to the adaptive filter 7 and to the first transfer characteristics simulation means 9. Here, the adaptive filter 7, coefficient updating means 8, first transfer characteristics simulation means 9, second transfer characteristics simulation means 10 and differential signal calculation means 11 are constituted by digital signal processing units (DSP).

Described below is a series of operations of the noise control device. Here, transfer characteristics of from the output of the adaptive filter 7 to the microphone 5-1, 5-2, 5-3 are denoted by Hd, average transfer characteristics of from the microphones 5 to the filter coefficient updating means 8 are denoted by Hm, and average transfer characteristics of from the tail pipe 2 which is the source of noise to the microphones 5 are denoted by Hnoise. Moreover, a noise signal from the tail pipe 2 is denoted by Sn, an output signal from the microphones 5 is denoted by Sm0, a compensation signal from the adaptive filter 7 is denoted by Sc, an input signal to the coefficient updating means 8 is denoted by Sm and a differential signal from an output signal of the differential signal calculation means 11 is denoted by Se. The differential signal will be used later as a reproduced noise signal to be input into the adaptive filter.

Then, the transfer characteristics Td1 simulated by the first transfer characteristics simulation means 9 and the second transfer characteristics simulation means 10 are given as, $$Hd1 = Hd \cdot Hm \tag{1}$$

and a signal Sm0 detected by the microphone 5 becomes as follows:

$$Sm0 = Sn \cdot H\text{noise} + Sc \cdot Hd \tag{2}$$

From the above-mentioned constitution and the above formulas (1) and (2), the differential signal Se which is a reproduced noise signal input to the adaptive filter 7 and is calculated by the differential signal calculation means 11, is obtained as follows:

$$\begin{aligned} Se &= Sm0 \cdot Hm - Sc \cdot Hd1 \\ &= (Sn \cdot H\text{noise} + Sc \cdot Hd) \cdot Hm - Sc \cdot Hd \cdot Hm \\ &= (Sn \cdot H\text{noise} + Sc \cdot Hd - Sc \cdot Hd) \cdot Hm \\ &= Sn \cdot H\text{noise} \cdot Hm \end{aligned} \tag{3}$$

The input signal Sm to the coefficient updating means 8 is given as, $$Sm = Sm0 \cdot Hm \tag{4}$$

The other input signal Te is obtained by the first transfer characteristics simulation means 9 considering the transfer characteristics Td1 in relation to the reproduced noise signal Se. In the adaptive filter 7, the filter coefficient is changed by the coefficient updating means 8, so that the input signal Sm becomes zero. Therefore, under the condition where Sm=0, i.e., Sm0=0, the compensation signal Sc output from the adaptive filter 7 is given from the above equation (2) as follows:

$$Sc = -Sn \cdot H\text{noise}/Hd \tag{5}$$

The coefficient updating means 8 finds a filter coefficient (Ck(n); K: number of stages) of FIR of the adaptive filter 7 by the method of least squares in compliance with the following equation, $$Ck(n) = Ck(n-1) + (Sm(n) \cdot \alpha / q(n+k-1)) \tag{6}$$

where $\alpha$ is a coefficient of convergence, Sm(n) is a synthesized signal of the microphones 5-1, 5-2 and 5-3, q(n+k−1) is a normalizing signal from the first transfer characteristics simulation means 9, and n is an ordinal number of a digital signal.

In the foregoing was described the noise control device in which a signal of silencing sound for silencing noise is formed by the speakers 3 and 4. Now, described below is an actuator 20 constituted by the speakers 3, 4 and the like.

Figure 2B:
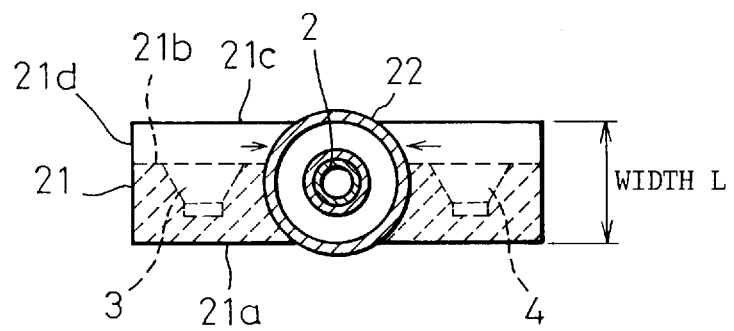

FIGS. 2(a) and 2(b) are a diagram illustrating the constitution of an actuator for the noise control device according to a first embodiment of the present invention, in which front faces of speakers are horizontal to the ground and directed in the upper direction. The actuator 20 shown in the diagram (a) comprises two speakers 3 and 4 symmetrically arranged with respect to the tail pipe 2 in a manner that their open surfaces (front surfaces) directed in the upper direction away from the ground respectively, an enclosure 21 that closes the rear portions of the speakers 3 and 4, and a silencing sound guide portion 22 that guides silencing sound from the front surfaces of the speakers 3 and 4 to the outlet of the tail pipe 2 along therewith. Space formed by the enclosure 21 at the rear portions of the speakers 3 and 4 is depicted by hatched lines. The enclosure 21 comprises as shown in the diagram (b) a plate 21a surrounding the rear portions of the speakers 3 and 4, a front plate 21b for mounting the opening portions of the speakers 3 and 4, a plate 21c opposed to the front surfaces of the speakers 3 and 4 in order to guide the silencing sound from the front surfaces of the speakers 3 and 4 to the silencing sound guide portion 22, and a side plate 21d. The diagram (b) is a front view of when the opening of the tail pipe 2 or of the silencing sound guide portion 22 is viewed from the direction of arrow A. As shown in this diagram, if the diameter of the opening portions of the speakers 3 and 4 becomes great, it is not necessary to make the width L of the enclosure 21 great. Therefore, according to the present embodiment, without increasing the width L of the enclosure 21, the speakers 3 and 4 may reduce low frequency noise caused by the great vibration thereof. Additionally, even if front surfaces of the speakers 3 and 4 are directed forward the ground, the same function and effect is obtained.

Figure 3A:
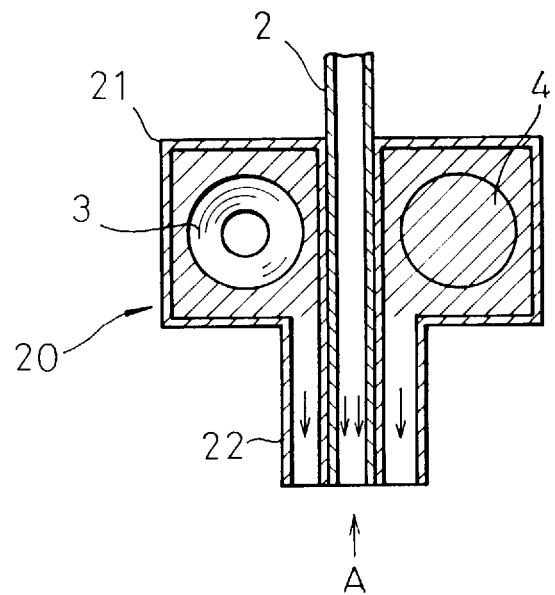
FIGS. 3(a) and 3(b) are diagrams illustrating a first modified constitution of the actuator for the noise control device according to the first embodiment of the present invention, in which front surfaces of speakers are directed in opposite directions.
Figure 3B:
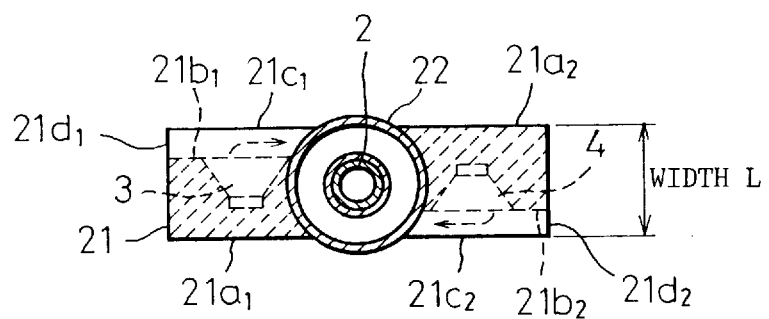

FIGS. 3(a) and 3(b) are a diagram illustrating a first modified constitution of the actuator for the noise control device according to the first embodiment of the present invention, in which front surfaces of the speakers are directed in opposite directions. What makes the actuator 20 shown in the diagram (a) different from that of FIGS. 2(a) and 2(b) is that the open surfaces of the speakers 3 and 4 are faced opposite relative to each other. The enclosure 21 shown in the diagram (b) comprises a plate 21a1 surrounding the rear portion of the speaker 3, a front plate 21b1 for mounting the opening portion of the speaker 3, a plate 21c1 opposed to the front surface of the speaker 3 in order to guide the silencing sound from the front surface of the speaker 3 to the silencing sound guide portion 22, and a side plate 21b1, and further comprises a plate 21a2 surrounding the rear portion of the speaker 4, a front plate 21d2 for mounting the opening portion of the speaker 4, a plate 21c2 opposed to the front surface of the speaker 4 in order to guide the silencing sound from the front surface of the speaker 4 to the silencing sound guide portion 22, and a side plate 21d2. Also, in this way, even if the diameter of the opening portions of the speakers 3 and 4 becomes great like those of FIGS. 2(a) and 2(b), it is not necessary to make the width L of the enclosure 21 great.

Figure 4A:
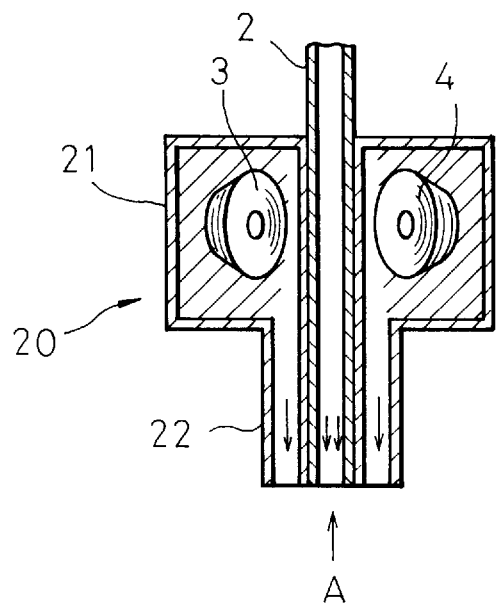
FIGS. 4(a) and 4(b) are diagrams illustrating a second modified constitution of the actuator for the noise control device according to the first embodiment of the present invention, in which front surfaces of speakers face each other at a constant angle in relation to the ground.
Figure 4B:
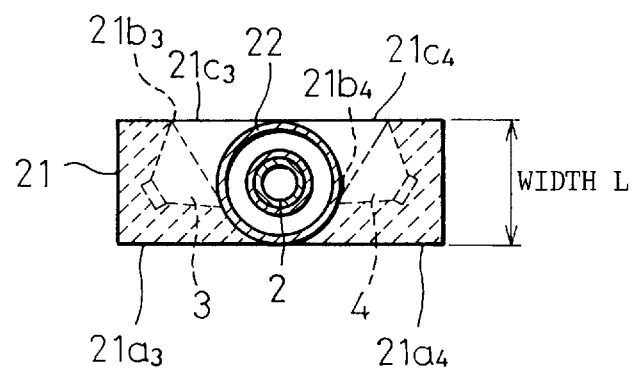

FIGS. 4(a) and 4(b) are a diagram illustrating a second modified constitution of the actuator for the noise control device according to the first embodiment of the present invention, in which front surfaces of speakers face each other at a constant angle in relation to the ground. What makes the actuator of the diagram (a) different from that of the first modification is that the two speakers 3 and 4 are so arranged in the enclosure 21 that the open surfaces of the speakers 3 and 4 face the tail pipe 2 maintaining a predetermined angle relative to each other, i.e., that the open surfaces are arranged in a V-shape. The enclosure 21 shown in the diagram (b) comprises a plate 21a3 that surrounds the rear portion of the speaker 3, a front plate 21b3 for mounting the opening portion of the speaker 3, a plate 21c3 opposed to the front surface of the speaker 3 to guide the silencing sound from the front surface of the speaker 3 to the silencing sound guide portion 22, and a side plate 21b3 (not shown) and further comprises a plate 21a4 that surrounds the rear portion of the speaker 4, a front plate 21b4 for mounting the opening portion of the speaker 4, a plate 21c4 opposed to the front surface of the speaker 4 to guide the silencing sound from the front surface of the speaker 4 to the silencing sound guide portion 22, and a side plate 21b4 (not shown). According to this modification in which the open surfaces of the speakers 3 and 4 define a predetermined angle relative to each other, the diameter of the openings of the speakers 3 and 4 can be substantially decreased with respect to the enclosure 21, and the width of the enclosure 21 holding the speakers 3 and 4 can be decreased.

Figure 5A:
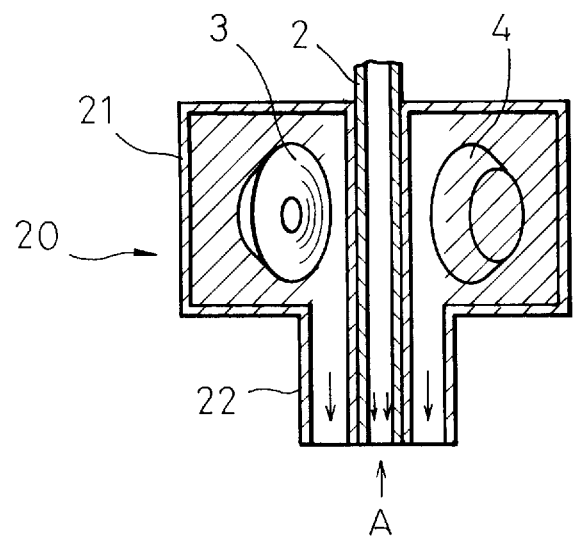
FIGS. 5(a) and 5(b) are diagrams illustrating a third modified constitution of the actuator for the noise control device according to the first embodiment of the present invention, in which front surfaces of speakers face each other at a constant angle in relation to the ground and in parallel with each other.
Figure 5B:
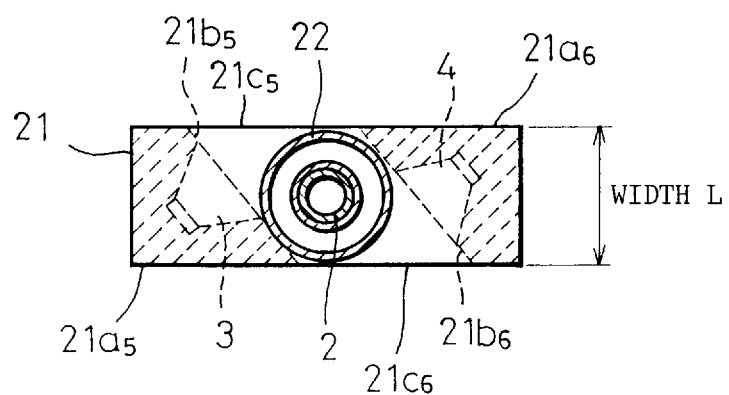

FIGS. 5(a) and 5(b) are a diagram illustrating a third modified constitution of the actuator for the noise control device according to the first embodiment of the present invention, in which the front surfaces of the speakers face each other at a constant angle in relation to ground and are in parallel with each other. What makes the actuator 20 shown in the diagram (a) different from that of the second modification is that the two speakers 3 and 4 are arranged in the enclosure 21 in a manner that their center lines are deviated from each other and that their open surfaces are opposed to each other. The actuator 20 shown in the diagram (b) comprises a plate 21a5 surrounding the rear portion of the speaker 3, a front plate 21b5 for mounting the opening portion of the speaker 3, a plate 21c5 opposed to the front surface of the speaker 3 to guide the silencing sound from the front surface of the speaker 3 to the silencing sound guide portion 22, and a side plate 21b5 (not shown) and further comprises a plate 21a6 surrounding the rear portion of the speaker 4, a front plate 21b6 for mounting the opening portion of the speaker 4, a plate 21c6 opposed to the front surface of the speaker 4 to guide the silencing sound from the front surface of the speaker 4 to the silencing sound guide portion 22, and a side plate 21b6 (not shown). This arrangement, too, makes it possible to decrease the width of the enclosure 21 like that of FIGS. 4(a) and 4(b).

The aforementioned constitution makes it possible to realize the body of the actuator 20 in a reduced thickness, i.e., to increase the diameter of the open surfaces of the speakers to reproduce low frequencies without producing any adverse effect. That is, an increased degree of freedom is maintained in combining with mufflers and the like, and the enclosure 21 maintains its volume and the low frequency-reproducing ability.

Although in the foregoing the case where two speakers exist was described, the same function and effect is obtained even if the only one speaker exists.

Figure 6A:
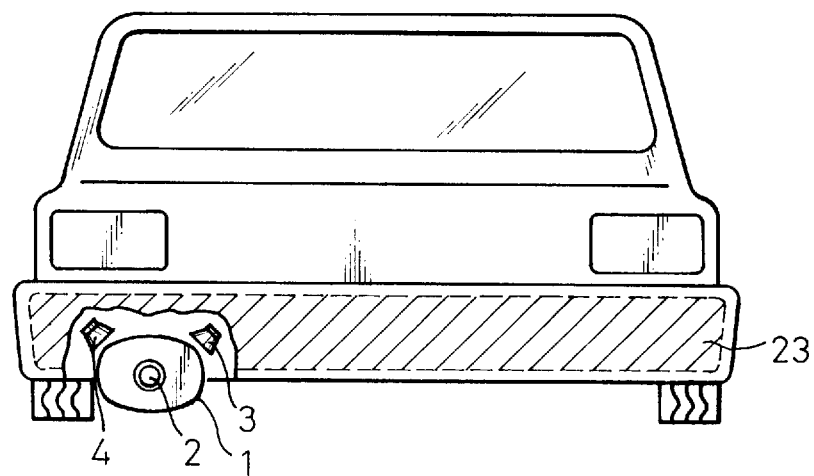
FIGS. 6(a) and 6(b) are diagrams illustrating the constitution of an actuator 20 of the noise control device according to a second embodiment of the present invention, in which a speaker uses a bumper as an enclosure.
Figure 6B:
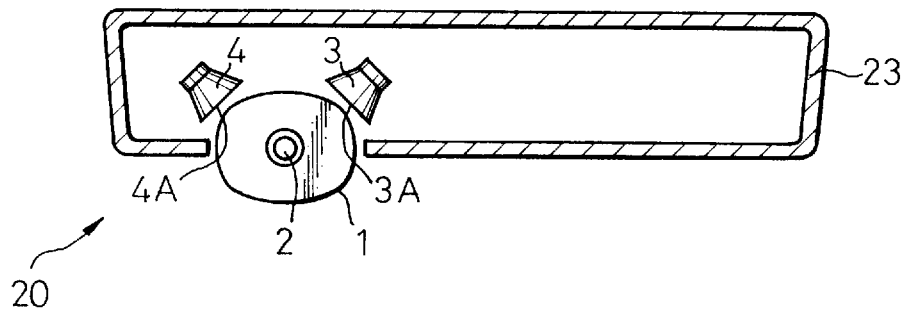

FIGS. 6(a) and 6(b) are a diagram illustrating the constitution of an actuator for the noise control device according to a second embodiment of the present invention, in which a speaker uses a bumper as an enclosure. The diagram (a) is a rear view of a passenger car which is usually provided at its rear end with a bumper that absorbs impact in case of collision to protect the body. The bumper is usually made of an urethane material in the form of a plate. In order to improve woofer characteristics of the speakers, furthermore, it is essential to increase the volume of the enclosure to facilitate the movement of the speaker corns. The actuator 20 according to this embodiment comprises speakers 3 and 4, and an enclosure 23 that also serves as a bumper which, as shown in the diagram (b), defines closed space to accommodate the speakers 3, 4 in a manner that the front surfaces of the speakers 3 and 4 are symmetrically arranged with respect to the tail pipe 2, such that silencing sound is directly emitted to near the outlet of the tail pipe 2 through openings 3A and 4A.

Figure 8:
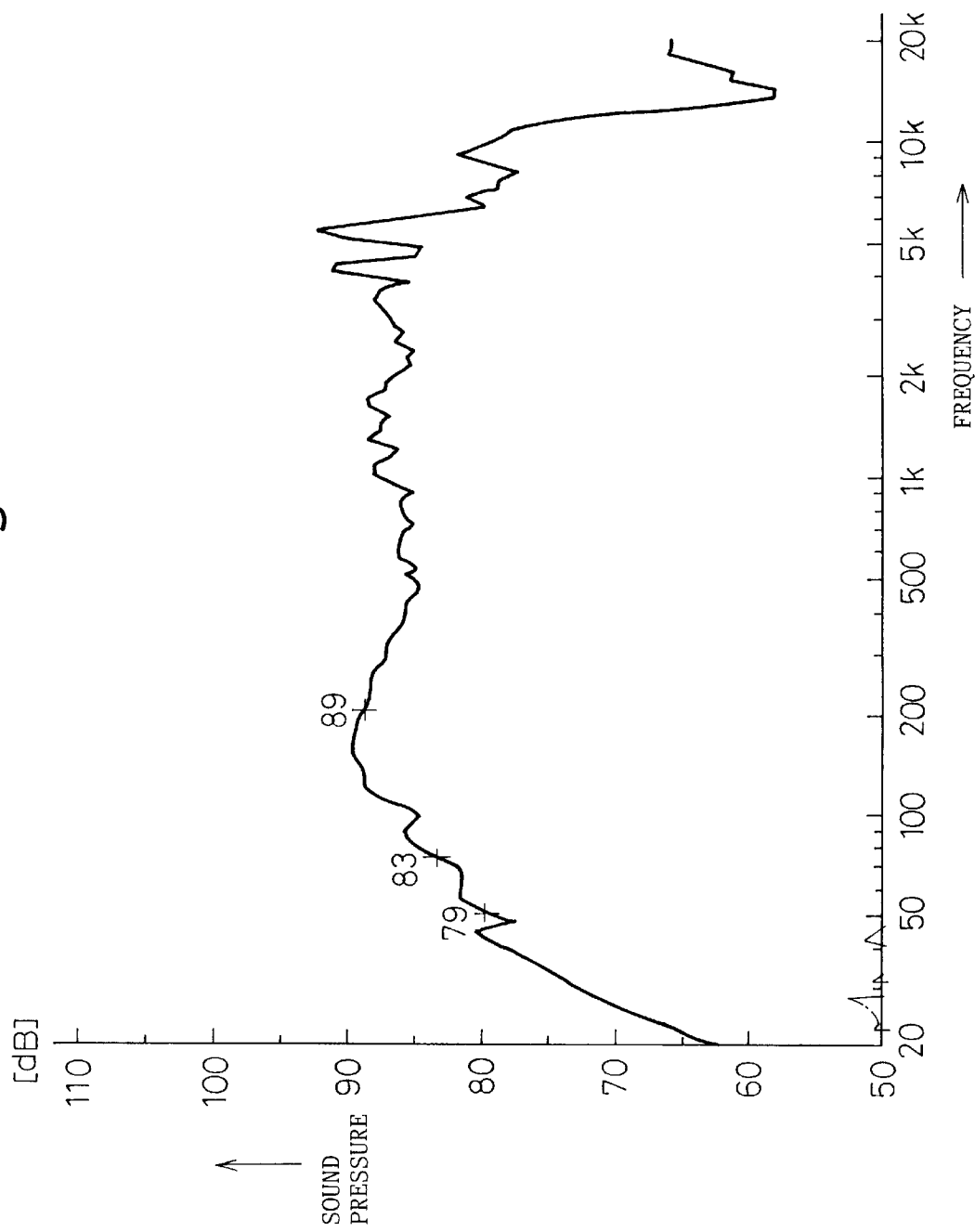

FIG. 7 and FIG. 8 are graphs explaining the influence of a resonant-cavity in a speaker which extends the frequency band thereof. The relations between the noise frequency and the sound pressure in the case that the volume of resonant-cavity is 6.2 liter and is 600 liter are shown in FIG. 7 and FIG. 8. It will be understood that the output of the sound pressure in a low frequency region increases as the volume of the resonant-cavity is increased. According to this embodiment, the speakers 3 and 4 are arranged at optimum positions with respect to the tail pipe 2, and the enclosure 23 that also serves as a bumper is allowed to have a greatly increased volume though it was so far difficult to obtain. This helps increase reproducing ability against bass noise of large amplitudes. Moreover, the above constitution makes it possible not only to effectively utilize space but also to increase strength since the enclosure 23 that also serves as a bumper exhibits a large flexural rigidity. Besides, an enclosure 21 having a large volume is not required, offering freedom in the layout of the actuator 20 and enabling the electronic muffler itself to be realized in a decreased size.

Figure 9:
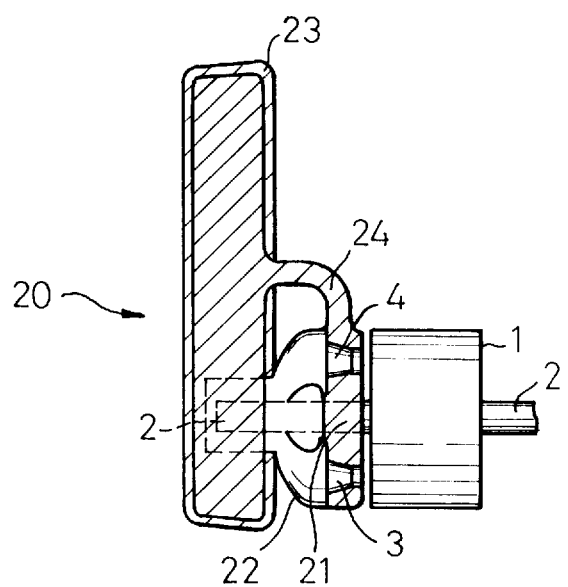
FIG. 9 is a diagram illustrating a first modified constitution of the actuator 20 of FIGS. 6(a) and 6(b), which is provided on the outside of an enclosure-bumper 23.

FIG. 9 is a diagram illustrating a first constitution of the actuator 20 of FIG. 6, which is provided outside of an enclosure-bumper 23. The actuator 20 diagramed here comprises speakers 3 and 4, a narrow enclosure 21 which closes the rear portions of the speakers 3, 4 and is installed near the muffler 1, a silencing sound guide portion 22 which guides the silencing sound from the front surfaces of the speakers 3, 4 to the tail pipe 2, an enclosure 23 which also serves as a bumper that defines closed space, and a duct 24 consisting of a flexible tube that spatially communicates the enclosure 23 that serves as the bumper and the enclosure 21 with each other. According to this embodiment, the enclosure 23 that also serves as a bumper helps increase the volume of the enclosure while maintaining space near the muffler 3 small, making it possible to increase reproducing ability against bass noise of large amplitudes like in the first embodiment.

Figure 10:
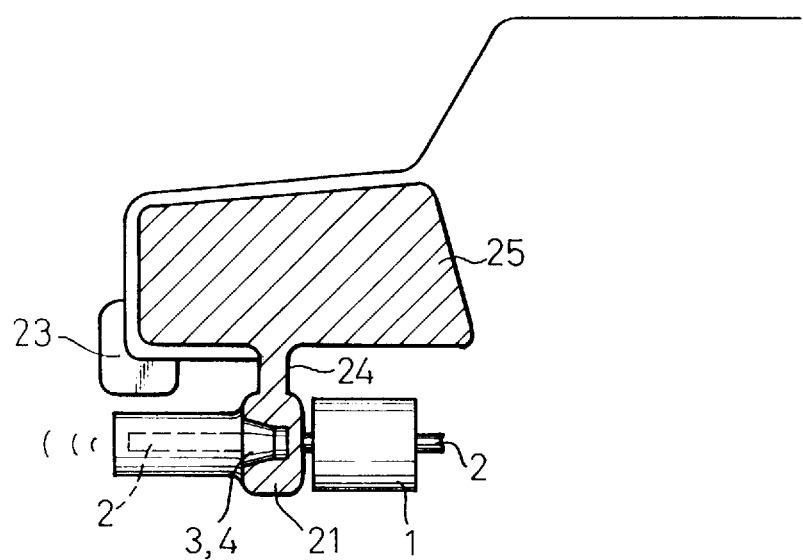
FIG. 10 is a diagram illustrating a second modified constitution of the actuator 20 of FIGS. 6(a) and 6(b), in which a speaker uses a trunk compartment as a resonant-cavity.

FIG. 10 is a diagram illustrating a second modified constitution of the actuator 20 of FIGS. 6(a) and 6(b), in which a speaker uses a trunk compartment as a resonant-cavity. The actuator 20 shown here comprises speakers 3 and 4, a narrow enclosure 21 which contains the speakers 2 and 3 in a closed manner and is installed near the muffler 1, an enclosure 25 which also serves as a trunk room for holding luggage, the trunk room being closed, and a duct 24 consisting of a flexible tube which spatially communicates the enclosure 25 which also serves as the trunk room and the enclosure 21 with each other. This embodiment exhibits the effects same as those of the first and second embodiments.

Figure 11:
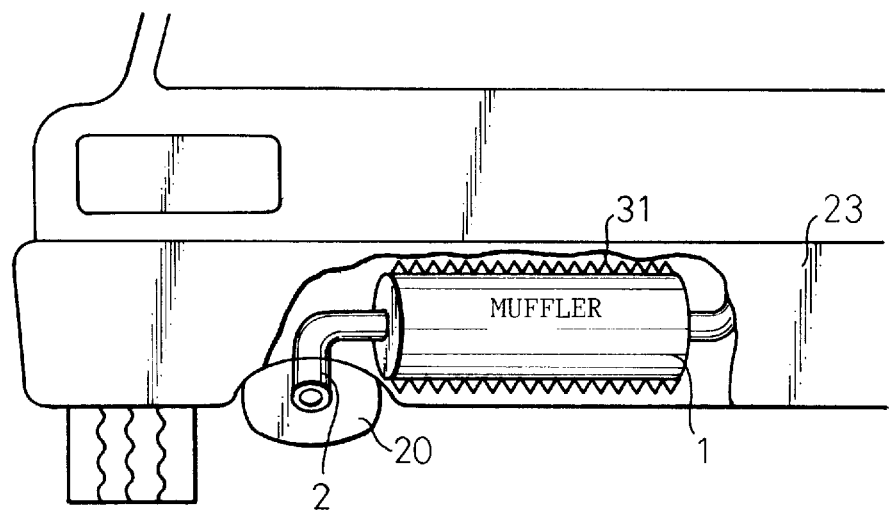
FIG. 11 and FIG. 12 are diagrams illustrating a third modified configuration of the actuator of FIGS. 6(a) and 6(b), in which a muffler 1 is removed to be set into a bumper 23 and thereby the speakers 3 and 4 are provided at the position from which the muffler 1 was removed.
Figure 12:
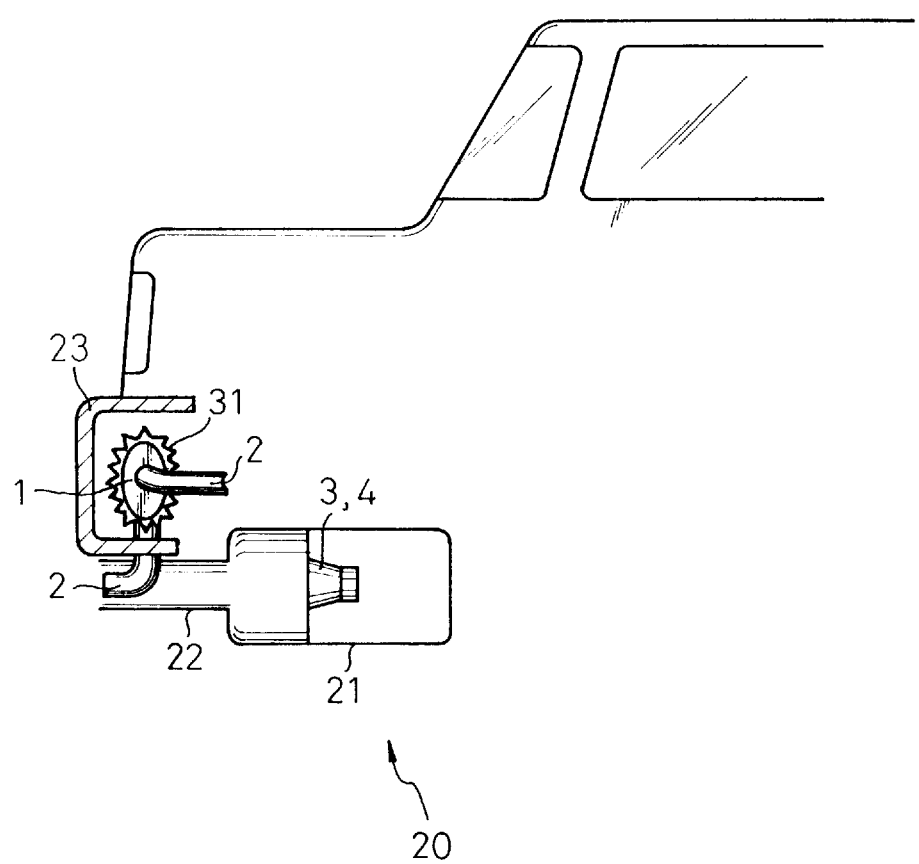

FIG. 11 and FIG. 12 are diagrams illustrating a third modified constitution of the actuator 20 of FIG. 6, in which a muffler 1 is removed to be set into a bumper 23 and thereby the speakers 3 and 4 are provided in the space from which the muffler 1 was removed. As shown in FIG. 11, the muffler 1 is installed on the back side of the bumper 23 at the rear part of the automobile along the lengthwise direction of the bumper 23 and is wrapped with the heat-shielding plate 31 so that the heat will not be radiated therefrom, and the tail pipe 2 is drawn toward the rear. The actuator 20 is disposed at the position where the muffler 1 used to exist. With the laterally elongated muffler 1 wrapped with the heat-shielding plate 31 being installed inside the bumper 23 as shown in FIG. 12, the actuator 20 comprises speakers 3 and 4, an enclosure 21 which is disposed at the position of the muffler 1 to close the rear portions of the speakers 3 and 4, and is allowed to have a sufficiently large volume for maintaining woofer characteristics, and a silencing sound guide portion 22 that is communicated to the outlet of the tail pipe 2 which is the outlet of the exhaust pipe. According to this embodiment, therefore, the muffler 1 that is installed inside the bumper 23 makes it possible to mount the enclosure of the actuator 20 having a sufficiently large capacity in the initial space. Therefore, the actuator 20 exhibits improved sound pressure reproducing ability being little affected by the heat.

Figure 13A:
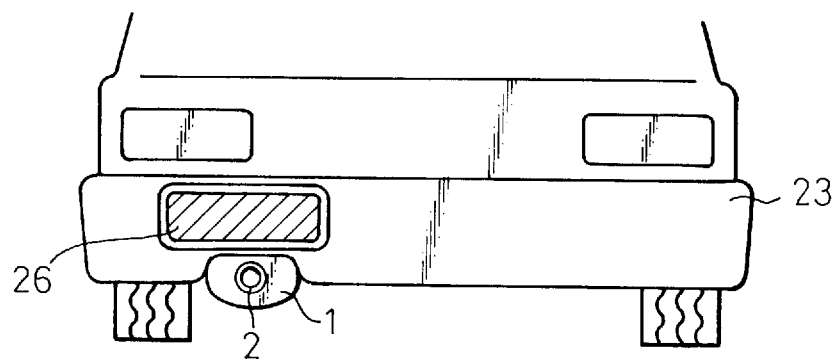
FIGS. 13(a) and 13(b) are diagrams illustrating a fourth modified configuration of the actuator of FIGS. 6(a) and 6(b), in which a portion of the body of the bumper 23 is used as a vibration plate 26 instead of the speakers 3 and 4.
Figure 13B:
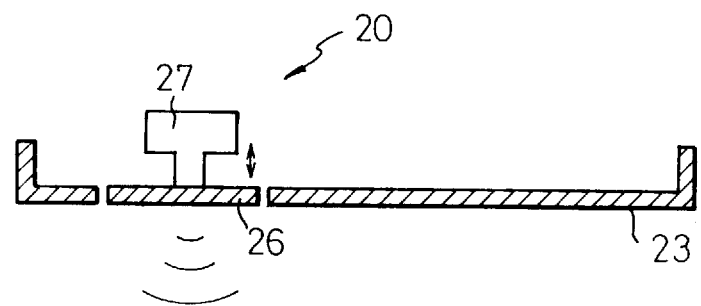

FIGS. 13(a) and 13(b) are a diagram illustrating a fourth modified constitution of the actuator 20 of FIGS. 6(a) and 6(b), in which a portion of the body of the bumper 23 is used as a vibration plate 26 instead of the speakers 3 and 4. Referring to the diagram (a), the actuator 20 comprises a vibration plate 26 buried in the bumper 23 near the tail pipe 2 of the muffler 1 at the rear portion of the automobile, and an excitation portion 27 that excites the vibration plate 26 on the back side of the bumper 23. The diagram (b) is a sectional view from the upper direction. As shown in the diagram (b), the excitation portion 27 and the vibration plate 26 are coupled together, and the vibration plate 26 is vibrated by the excitation portion 27 to form silencing sound. The excitation portion 27 may be the one that is placed in the market. The whole bumper 23 may be used as the vibration plate 26. In this case, the plate portion of the bumper 23 vibrates with the fastening portions (not shown) of the bumper 23 as nodes. According to this embodiment, therefore, what substantially occupies the volume is the excitation portion 27 only in the actuator 20 that utilizes the vibration plate 26 and the excitation portion 27 instead of the speakers. Therefore, the actuator 20 is realized in a spatially reduced size and can be used over an extended range of applications under the heated and humid (moisture) conditions where the speakers cannot be used, lending itself well for being used as an electronic muffler.

Figure 14A:
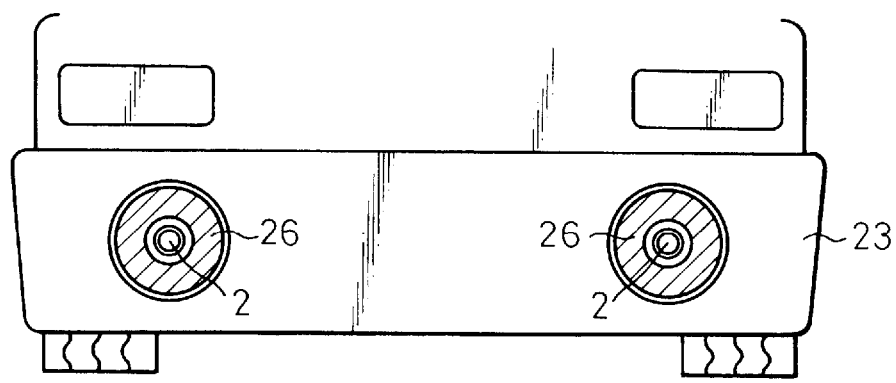
FIGS. 14(a) and 14(b) are diagrams illustrating a fifth modified configuration of the actuator 20 of FIGS. 13(a) and 13(b), in which two places in a portion of the bumper 23 are used as a vibration plate 26.
Figure 14B:
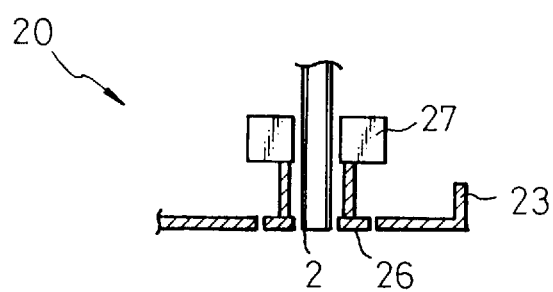

FIGS. 14(a) and 14(b) are a diagram illustrating a fifth modified configuration of the actuator 20 of FIGS. 13(a) and 13(b), in which two places in a portion of the bumper 23 are used as a vibration plate 26. With reference to the diagram (a) which shows the back surface of the automobile, the actuator 20 has the tail pipe 2 that protrudes to be nearly in flush with the bumper 23 through the opening thereof, and further comprises a vibration plate 26 of a doughnut shape buried in the bumper 23 to surround the tail pipe 2 and an excitation portion 27 that excites the vibration plate 26 around the tail pipe 2 on the back side of the bumper 23 as shown in a sectional view of the diagram (b) that is viewed from the upper direction. With reference to the diagram (a), when there are two tail pipes 2 at the rear portion, the actuators 20 should be provided for them, respectively, in the same manner as described above. The above-mentioned modified constitution makes it possible to obtain the effects same as those of the fifth embodiment. According to the present invention as described above, a large volume is provided for the rear portions of the speakers owing to closed space defined by the enclosure which also serves as a bumper that absorbs impact in case of collision. Therefore, bass noise of large amplitudes can be efficiently silenced. With the vibration plate being excited buried in the bumper, furthermore, the device exhibits increased resistance against the heat and humidity.

Figure 15A:
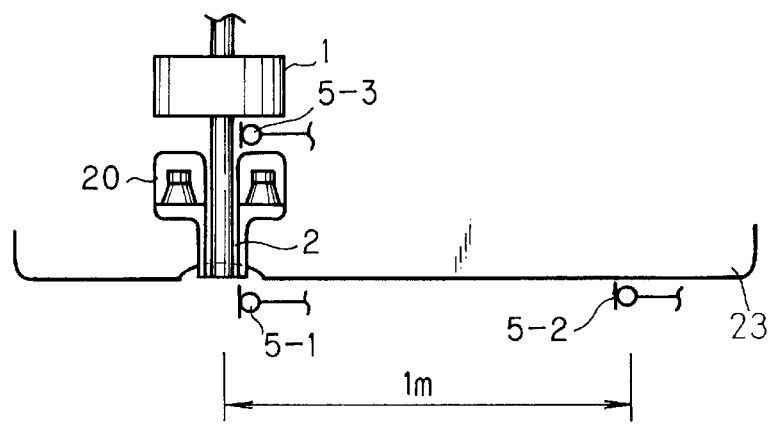
FIGS. 15(a) and 15(b) are diagrams illustrating a third embodiment of the present invention in which a plurality of sensors are arranged at the rear parts of an automobile.
Figure 15B:
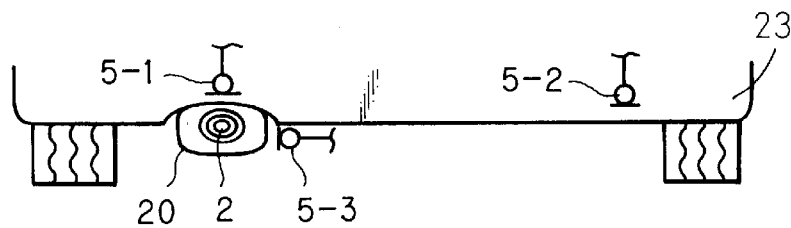

FIGS. 15(a) and 15(b) are a diagram illustrating a third embodiment of the present invention in which a plurality of sensors are arranged. In the diagrams (a) and (b) illustrating the rear portion of an automobile as viewed from the upper direction and the front, the first microphone 5-1 is installed at the outlet of the tail pipe 2 in a customary manner. The second microphone 5-2 is installed at a position remote from the first microphone 5-1 in the side direction by about 1 meter. The third microphone 5-3 is installed between the actuator 20 and the muffler 1 to pick up noise that leaks through space between the tail pipe 2 and the silencing sound guide portion 22. Mentioned above is an arrangement of the microphones 5-1, 5-2 and 5-3 which may be installed at various other places, as a matter of course. In this example, if the microphones are provided at portions apart from the neighborhood of the outlet of the tail pipe 2 and at the backside of the actuator 20, the provision is convenient because it becomes possible to detect noise at each position.

Figure 16:
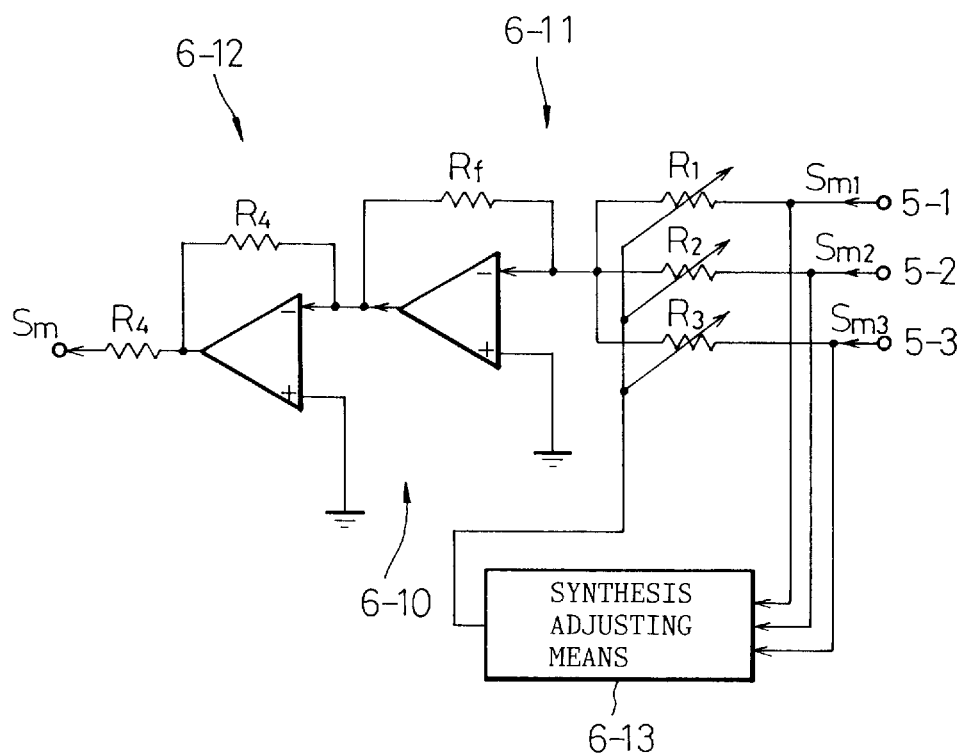
FIG. 16 is a diagram illustrating the signal process of a plurality of sensors of FIGS. 15(a) and 15(b)
Figure 17A:
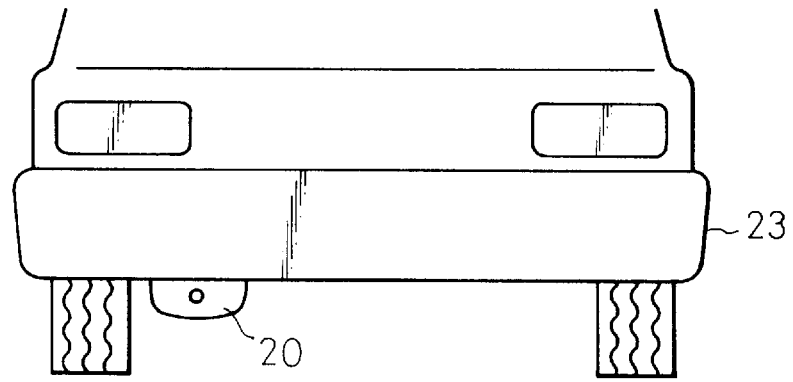
FIGS. 17(a), 17(b) and 17(c) are diagrams illustrating the constitution of an actuator 20 in a conventional noise control device.
Figure 17B:
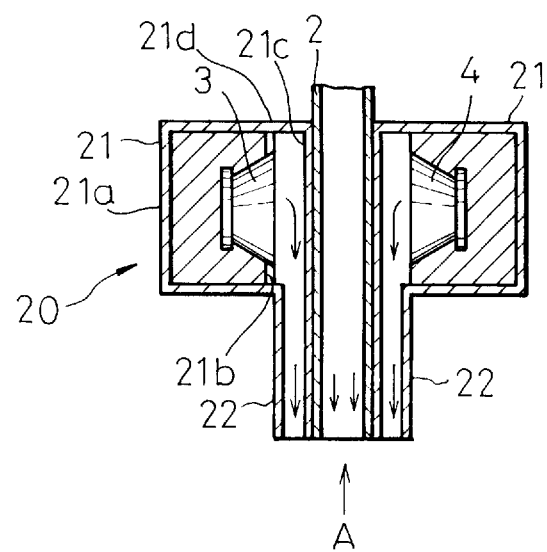
Figure 17C:
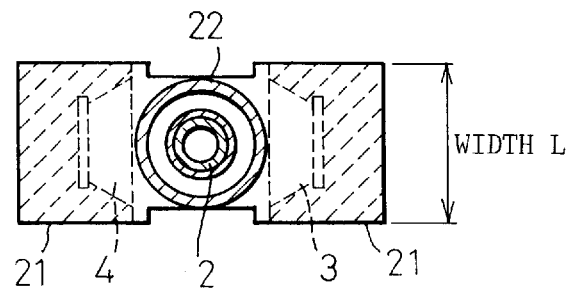
Figure 18A:
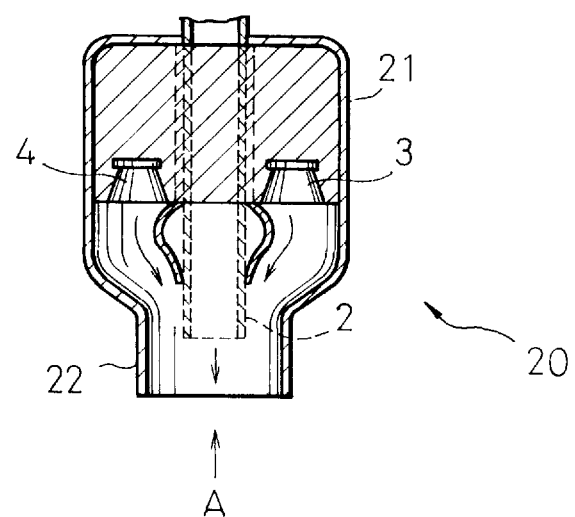
FIGS. 18(a) and 18(b) are diagrams illustrating the constitution of another actuator 20 in a conventional noise control device.
Figure 18B:
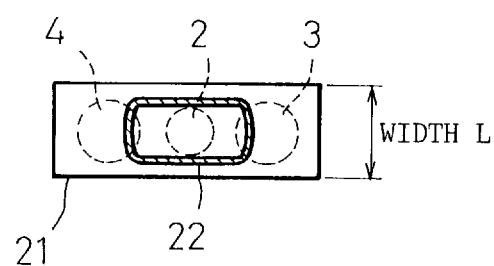

FIG. 16 is a diagram illustrating the signal process of a plurality of sensors of FIGS. 15(a) and 15(b). The synthesizing circuit 6-10 shown here includes an adder circuit 6-11 that adds up signals from the microphones 5-1, 5-2 and 5-3, an invertor circuit 6-12 that inverts the output of the adder circuit 6-11, and a synthesis adjusting means 6-13 which changes the rate of synthesis of outputs of the microphones 5-1, 5-2 and 5-3 by adjusting resistors R1, R2 and R3 of the adder circuit 6-11. The synthesis adjusting means 6-13 is adjusted at an initial stage to change resistances of the resistors R1, R2 and R3 of the adder circuit depending upon the contribution degrees for silencing noise of the microphones 5-1, 5-2 and 5-3, for example, to increase the outputs of the microphones arranged closer to the speakers 3 and 4 when synthesizing. The signals Sm1, Sm2 and Sm3 from the microphones 5-1, 5-2 and 5-3 are synthesized so as to be output as Sm.

As explained above, according to the present invention, the disparity of the silenced effect in space can be avoided and thereby a homogeneous silenced effect can be obtained.

The speakers of the noise control device according to the present invention can be used for controlling noise discharged with the exhaust gas of various automobiles and are suitable to reduce the volume of a speaker, to make the frequency band thereof broad and prevent the noise-decreasing effect from changing in space.

We claim:

1. A noise control device disposed at the outlet of a tail pipe which emits noise at the terminal pipe of a muffler that silences exhaust noise of an automobile, in order to silence noise emitted from said tail pipe, the noise control device comprising a plurality of speakers and a closed space, formed by a bumper for absorbing an impact in the case of a collision, said closed space formed by the bumper is used as a resonant-cavity of said speakers, to output silencing sound having a phase opposite to and a sound pressure equal to noise sound emitted from the tail pipe, said speakers being provided in the vicinity of said tail pipe outside of said bumper and a duct being provided between rear portions of the speakers and said bumper.

2. A noise control device disposed at the outlet of a tail pipe which emits noise at the terminal pipe of a muffler that silences exhaust noise of an automobile, in order to silence noise emitted from said tail pipe, the noise control device comprising a plurality of speakers and a closed space, formed by a bumper, for absorbing an impact in the case of a collision, said closed space formed by the bumper is used as resonant-cavity of said speakers, to output silencing sound having a phase opposite to and a sound pressure equal to noise sound emitted from the tail pipe, the muffler being removed to be installed on the backside of said bumper along the lengthwise direction of the bumper and said speakers being positioned in the space from which the muffler was removed and proximate the tail pipe.

3. A noise control device disposed at the outlet of a tail pipe which emits noise at the terminal pipe of a muffler that silences exhaust noise of an automobile, in order to silence noise emitted from said tail pipe characterized by using a closed space of a trunk compartment for holding luggage as a resonant-cavity of a plurality of speakers for outputting silencing sound having a phase opposite to and a sound pressure equal to noise emitted from the tail pipe, said speakers being provided in the vicinity of the tail pipe outside of said trunk compartment and a duct being provided between rear portions of the speakers and said trunk compartment.

4. A noise control device disposed at the outlet of a tail pipe which emits noise at the terminal pipe of a muffler that silences exhaust noise of an automobile, in order to silence noise emitted from said tail pipe comprising:

a plurality of microphones installed apart from each other and at a constant distance from a plurality of speakers for outputting silencing sound having a phase opposite to and a sound pressure equal to noise sound emitted from the tail pipe; and a synthesizing circuit for synthesizing outputs of the microphones which are weighted depending upon the amount of silencing that occurs when the plurality of the microphones traps a residual noise gained by interference of said silencing sound and said noise sound, said amount of silencing becoming greater as the microphones are arranged to be closer to speakers.

5. The noise control device of claim 4, characterized by positioning said microphone near the outlet of the tail pipe, positioning said microphone apart by a constant distance from the tail pipe, and positioning said microphone at the backside of the speaker.

* * * * *